(12) United States Patent
Lee

(10) Patent No.: US 7,725,975 B2
(45) Date of Patent: Jun. 1, 2010

(54) DEVICE FOR CLEANING LCD PANEL

(75) Inventor: Choong Un Lee, Taegu-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 751 days.

(21) Appl. No.: 10/243,874

(22) Filed: Sep. 16, 2002

(65) Prior Publication Data

US 2003/0053024 A1    Mar. 20, 2003

(30) Foreign Application Priority Data

Sep. 19, 2001    (KR) ............................. 2001-58019

(51) Int. Cl.
*G02F 1/13*    (2006.01)
*A47L 15/00*    (2006.01)

(52) U.S. Cl. ............................... 15/77; 15/88.2; 15/102

(58) Field of Classification Search .................. 15/77, 15/88.2, 88.3, 102, 21.1, 3.1–3.2, 88.1, 345.54; 156/345.54

See application file for complete search history.

(56) References Cited

U.S. PATENT DOCUMENTS

| 5,937,469 | A | * | 8/1999 | Culkins et al. | .................. | 15/77 |
| 5,966,765 | A | * | 10/1999 | Hamada et al. | ................. | 15/77 |
| 6,290,780 | B1 | * | 9/2001 | Ravkin | .......................... | 134/6 |

* cited by examiner

*Primary Examiner*—Shay L Karls
(74) *Attorney, Agent, or Firm*—Morgan, Lewis & Bockius LLP

(57) ABSTRACT

A device for cleaning a liquid crystal display panel including at least one pad part cleaning brush removing foreign matters from a pad part of the liquid crystal display panel, a holder holding the pad part cleaning brush, a driving shaft rotating the holder, and a driving motor providing a rotating force to the driving shaft.

9 Claims, 2 Drawing Sheets

DEVICE FOR CLEANING LCD PANEL

The present invention claims the benefit of Korean Application No. P2001-0058019 filed on Sep. 19, 2001, which is hereby incorporated by reference.

BACKGROUND OF THE INVENTION

1. Field of the Invention

The present invention relates to a cleaning device, and more particularly, to a device for cleaning a liquid crystal display (LCD) panel for effective removal of foreign matters after grinding the LCD panel.

2. Discussion of the Related Art

The fields of use for LCD's have gradually increased since LCD's have overcome many of the disadvantages of the CRT (Cathode Ray Tube). The increase in use is due to the advantages of the LCD such as great contrast ratio, suitable for expression of gradation and display of a motion picture, and small power consumption.

The LCD panel is generally provided with a thin film transistor substrate having a thin film transistor and a pixel electrode in every pixel region defined by gatelines and datalines, a color filter substrate having a color filter layer and a common electrode, and a liquid crystal layer between the two substrates.

A related art device for cleaning a LCD panel will be explained with reference to the attached drawings.

FIG. 1 illustrates a perspective view of a related art cleaning device, and FIG. 2 illustrates a side view of the related art cleaning device.

Referring to FIG. 1, in general, the cleaning device is provided with a plurality of brushes 1 over a substrate 4 to be cleaned, driving shafts 2 each for holding and rotating the brush, a driving motor (not shown) for rotating the driving shafts 2, a plurality of transfer rollers 6 under the substrate 4 to be cleaned for transfer of the substrate 4, and rotation shafts 7 for rotating the transfer rollers in one direction. The cleaning device rotates the brushes 1 in a direction, the same with, or opposite to, a direction of movement of the substrate 4, for cleaning the substrate 4.

However, the cleaning device has the following problems in removing foreign matters on the LCD panel passed through grinding.

Referring to FIG. 2, the LCD panel 10 has an upper substrate 10a and a lower substrate 10b, both of which are bonded together, and a liquid crystal layer between the substrates. Consequently, since the brush 1 brushes only a surface of the LCD panel, i.e., only the substrate 10a, without being brought into contact with a pad part 5 of the lower substrate 10b comparatively below the upper substrate 10a, foreign matters on the pad part 5 are not removed. Although the foreign matters on the pad part 5 may be removed by an ultrasonic wave, the effect is not satisfactory.

The foreign matters not removed cause scratches on the surface of the substrate, or shorts between pad part patterns, impeding regular operation of the LCD panel.

SUMMARY OF THE INVENTION

Accordingly, the present invention is directed to a device for cleaning an LCD panel that substantially obviates one or more of the problems due to limitations and disadvantages of the related art.

An object of the present invention is to provide a device for cleaning an LCD panel, which can remove foreign matters on a pad part effectively.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for cleaning a liquid crystal display panel includes at least one pad part cleaning brush removing foreign matters from the pad part of the liquid crystal display panel, a holder holding the pad part cleaning brush, a driving shaft rotating the holder, a driving motor providing a rotating force to the driving shaft, and a transfer device moving the liquid crystal display panel in one direction, thereby removing foreign matters scattered on the LCD panel having a liquid crystal layer between an upper substrate and a lower substrate.

In another aspect, the device for cleaning a liquid crystal display panel having a liquid crystal layer between upper and lower substrates includes at least one brush removing foreign matters from the upper substrate, a first driving shaft rotating the at least one brush removing foreign matters from the upper substrate, at least one brush removing foreign matters from the lower substrate, a holder holding the at least one brush removing foreign matters from the lower substrate, a second driving shaft rotating the holder, and a driving motor providing a rotating force to the first and second driving shafts.

Since the pad part cleaning brush has a width fit to a width of the pad part, the foreign matters can be effectively removed from the pad part, and since the pad part cleaning brush is movable along the holder in left and right directions, different sizes and models of LCD panels can be cleaned.

Since the holder and driving shaft are detachable, the pad part cleaning brush is easily replaceable.

Thus, the cleaning device of the present invention may be fitted with the pad part cleaning brush for removal of foreign matters only from the pad part, or fitted both with the pad part cleaning brush and the conventional brush for removal of foreign matters from the pad part as well as the upper substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENT

Figure 1:
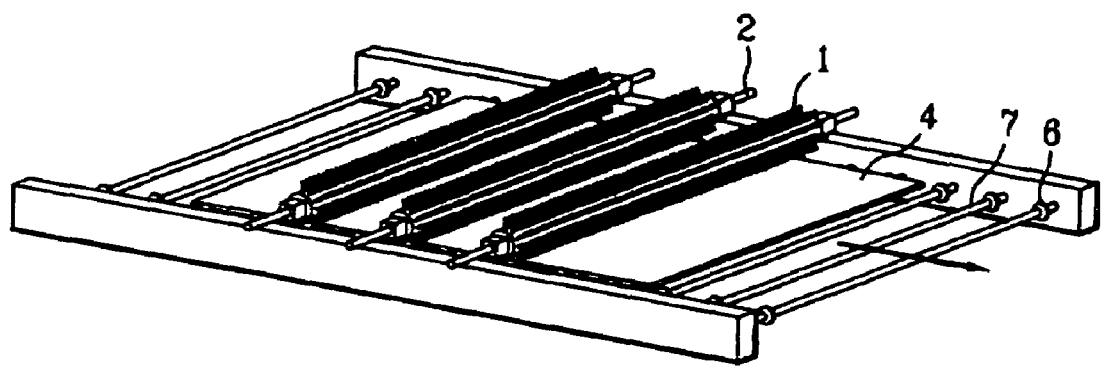
FIG. 1 illustrates a perspective view of a related art cleaning device.
Figure 2:
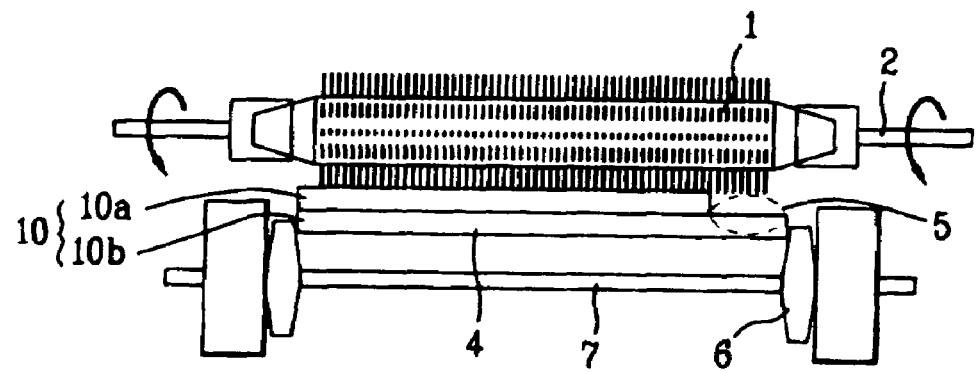
FIG. 2 illustrates a side view of the related art cleaning device.
Figure 3:
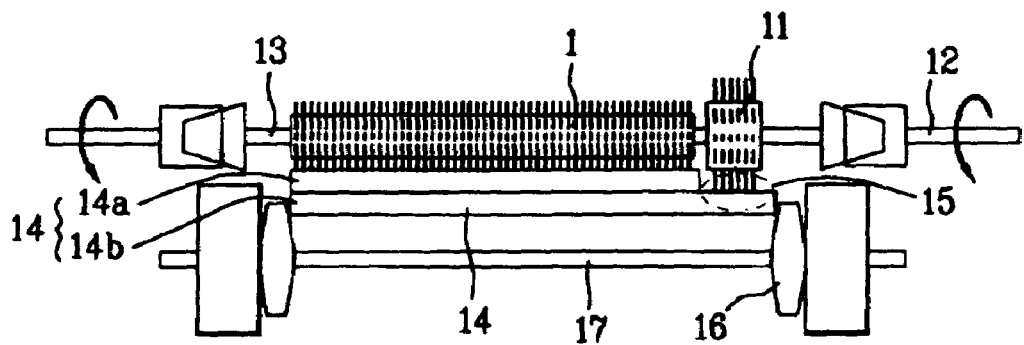
FIG. 3 illustrates a perspective view of a cleaning device in accordance with a preferred embodiment of the present invention.
Figure 4:
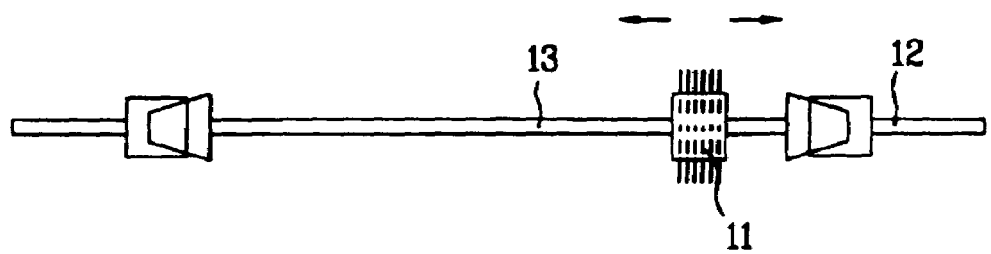
FIGS. 4 and 5 illustrate systems of the cleaning devices of the present invention.

Reference will now be made in detail to the preferred embodiments of the present invention, examples of which are illustrated in the accompanying drawings. FIG. 3 illustrates a perspective view of a cleaning device in accordance with a preferred embodiment of the present invention, and FIG. 4 illustrates a system of the cleaning device of the present invention.

Referring to FIG. 3, the cleaning device for effective removal of foreign matters from a pad part of an LCD panel 14, to resolve DPO (Data Pad Open), and the like, includes at least one pad part cleaning brush 11 arranged over a pad part 15 of the LCD panel 14 having a width fit to the pad part 15, for removal of foreign matters from the pad part, a holder 13 for holding the pad part holding brush 11, a driving shaft 12 connected to a driving motor (not shown) for driving the holder 13 in one direction, a plurality of transfer rollers 16 fitted below the LCD panel 14 for transfer of the LCD panel 14, and a rotating shaft 17 connected to a power supply motor for rotating the transfer rollers 16 in one direction.

The LCD panel 14 includes an upper substrate 14a having a thin film transistor and a pixel electrode in every pixel region defined by gate lines and data lines, a lower substrate 14b having a color filter layer and a common electrode, and a liquid crystal layer between the upper and lower substrates 14a and 14b.

The LCD panel 14 in FIG. 3 illustrates a state bonded substrate cut into a fixed size after upper and lower substrates 14a and 14b having patterns required for driving the device are bonded with sealant. The sealant serves as an adhesive and is applied between the upper and lower substrates 14a and 14b.

The following process is required for cutting the LCD panel 14.

At first, after forming a crack by using a scribe wheel in a surface of the upper or lower substrate 14a, or 14b, a direct impact is applied to the crack by using a break bar to separate cells. Next, after liquid crystal is injected into a space between the two cut substrates and sealed, rough cut surfaces and edges from the scribing/breaking are ground by using a certain mesh of grinding stone. This is done to preventing breakage at the cut surfaces and edges when a liquid crystal module is assembled and fitted to a unit set.

In this instance, foreign matters are formed in the scribing/breaking/grinding processes, and scattered on a surface of the LCD panel. Consequently, a cleaning process is required for the removal of foreign matters. The present invention suggests using the pad part cleaning brush 11 for effective removal of the foreign matters on the pad part 15 of the LCD panel 14.

Referring to FIG. 4, the pad part cleaning brush 11 is designed to be movable in left right direction along a holder 13 for adjusting a position of the pad part cleaning brush 11 according to a position of the pad part 15 of the LCD panel. A pin, or the like may be used for fixing the pad part cleaning brush 11 to the holder 13.

Thus, since the pad part cleaning brush 11 is movable, the LCD panel can be cleaned by adjusting the position of the pad part cleaning brush 11 according to a size and a model of the LCD panel. Moreover, two pad part cleaning brushes 11 may be fitted to the holder 13 for cleaning pad parts 15 of the LCD panel having double pads.

Figure 5:
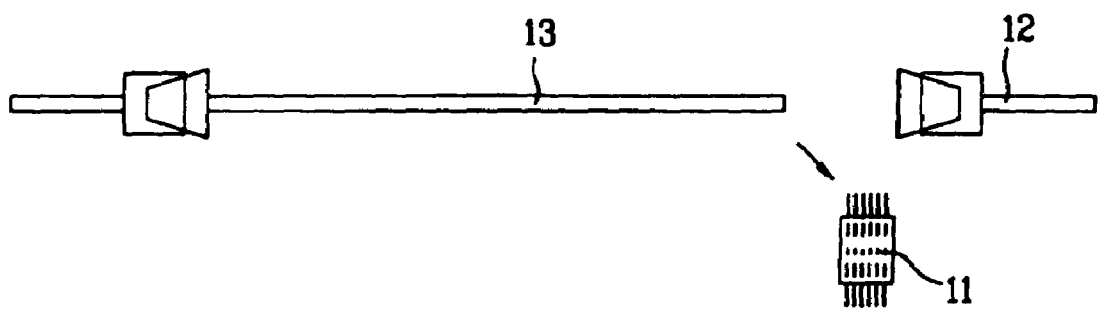

Referring to FIG. 5, the driving shaft 12 is designed to be detachable from the holder 13, so that it may be detached from the holder 13 and replaced when the brush 11 is worn out.

Thus, the cleaning device of the present invention facilitates the fitting of the pad part cleaning brush 11 only for removal of foreign matters from the pad part 15 as necessary. In this instance, the pad part cleaning device 11 is fitted so as to be in contact with the pad part 15 of the lower substrate 14b.

Moreover, both the pad part cleaning brush 11 and a conventional brush 1 may be fitted for removal of foreign matters not only from the pad part 15, but also from a surface of the upper substrate 14a. The pad part cleaning brush 11 is fitted so as to be in contact with the pad part 15, and the conventional brush 1 is fitted so as to be in contact with the surface of the upper substrate 14a. Accordingly, defects on the pad part 15 can be prevented since foreign matters can be completely removed from the pad part 15 by physical force.

The foregoing device for cleaning an LCD panel of the present invention has the following advantages.

First, the effective removal of foreign matters from the pad part reduces defective LCD panel caused by foreign matters.

Second, the position adjustable pad part cleaning brush of the present invention permits cleaning pad parts of different models with different positions of the pad parts. Furthermore, the pad part cleaning brush can be easily replaced.

It will be apparent to those skilled in the art that various modifications and variations can be made in the device for cleaning an LCD panel of the present invention without departing from the spirit or scope of the invention. Thus, it is intended that the present invention cover the modifications and variations of this invention provided they come within the scope of the appended claims and their equivalents.

What is claimed is:

1. A device for cleaning a liquid crystal display panel including a lower substrate and an upper substrate facing each other, the lower substrate including a pad part that is free of being overlapped with the upper substrate, the device comprising:

a brush removing foreign matters from a surface of the upper substrate, at least one pad part cleaning brush removing foreign matters from a pad part of the lower substrate, wherein the pad part cleaning brush is in contact with the pad part and rotates in a same direction with the brush, a holder holding the pad part cleaning brush;

a driving shaft rotating the holder; and a driving motor providing a rotating force to the driving shaft, wherein the pad part cleaning brush has a width which is smaller than a width of the brush and is overlapped with the pad part of the lower substrate, the brush and the pad part cleaning brush can separate from the holder and are used selectively, and wherein a rotation axis direction of the pad part cleaning brush is same as a rotation axis direction of the brush.

2. The device as claimed in claim 1, wherein the pad part cleaning brush is movable along the holder.

3. The device as claimed in claim 1, further comprising a transfer device moving the liquid crystal display panel in one direction.

4. The device as claimed in claim 1, wherein the holder and the driving shaft are detachable.

5. A device for cleaning a liquid crystal display panel having a liquid crystal layer between upper and lower substrates, comprising:

a first brush removing foreign matters from the upper substrate;

a first driving shaft rotating the first brush removing foreign matters from the upper substrate;

at least one second brush removing foreign matters from a pad part of the lower substrate, wherein the second brush is in contact with the pad part and rotates in a same direction with the first brush;

a holder holding the at least one second brush;

a second driving shaft rotating the holder; and a driving motor providing a rotating force to the first and second driving shafts, wherein the second brush has a width which is smaller than a width of the first brush and is overlapped with the pad part of the lower substrate, the first brush and the second brush can separate from the holder and are used selectively; and wherein a rotation axis direction of the second brush is same as a rotation axis direction of the first brush.

6. The device as claimed in claim 5, wherein the first brush removing matters from the upper substrate contacts with the upper substrate.

7. The device as claimed in claim 5, wherein the second brush is movable along the holder.

8. The device as claimed in claim 5, wherein the holder and the second driving shaft are detachable.

9. The device as claimed in claim 5, further comprising a transfer device moving the upper and lower substrates in one direction.

* * * * *